Patented Jan. 13, 1931

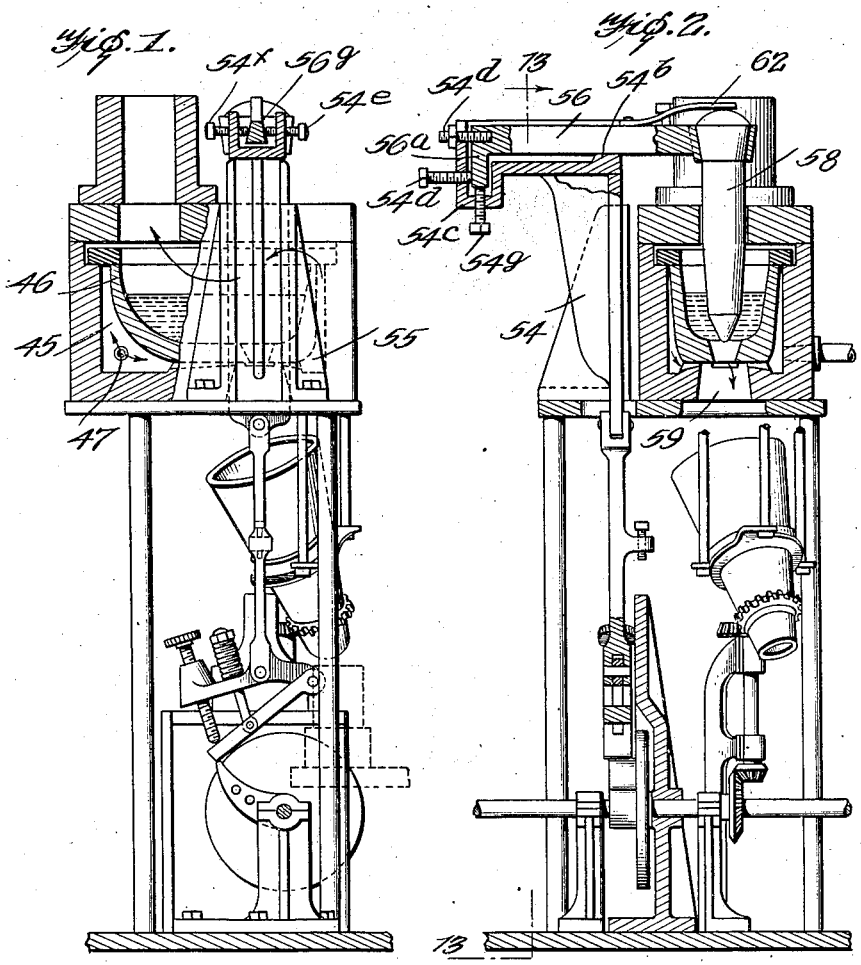
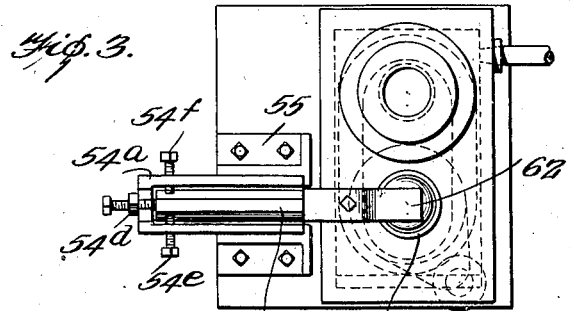

1,788,413

UNITED STATES PATENT OFFICE

THEODORE C. STEIMER, DECEASED, LATE OF PITTSBURGH, PENNSYLVANIA, BY CHARLES M. STEIMER, EXECUTOR, OF ZANESVILLE, OHIO, ASSIGNOR, BY MESNE ASSIGNMENTS, TO HARTFORD-EMPIRE COMPANY, OF HARTFORD, CONNECTICUT, A CORPORATION OF DELAWARE

GLASS-FEEDING MECHANISM

Original application filed February 12, 1910, Serial No. 543,582, and in Canada January 26, 1918. Divided and this application filed October 27, 1925. Serial No. 65,189.

The invention herein claimed relates to the art of feeding glass for the manufacture of pressed or blown articles, such as tableware and the like.

The structure herein shown comprises a chamber for holding molten glass, having a discharge orifice in the bottom, in which chamber vertically reciprocates in alignment with the orifice a plunger to control the issue of glass from the orifice. In another application, Serial No. 759,172, also filed as a division of the original application of THEODORE C. STEIMER (deceased), mechanism for reciprocating the plunger and for determining the limits of its path of movement are described in detail and claimed. The present application has for its object to claim the means by which such plunger is mounted and guided for movement.

Referring to the accompanying drawings which are part of those filed in the original application aforesaid, and which show, in addition to the features herein claimed, certain matters to be claimed in the aforesaid original application, and other divisions thereof,—

Figure 1 is a partial side elevation and partial section of the mechanism invented by THEODORE C. STEIMER, and embodying the subject-matter of this application, the section being taken partially on the line 13 of Figure 2.

Figure 2 is a section thereof and an elevation of a different view of the same mechanism.

Figure 3 is a plan view of parts shown in the aforesaid figures.

To explain briefly the general nature of this invention, it may be stated that the chamber 45 has therein a pot 46 containing glass, which by means of a reciprocating plunger 58 is divided as it issues from the bottom outlet 59. The plunger, which does not contact with the walls of the submerged outlet 59, serves to control the issue of glass from the outlet and its delivery to the mold M. The chamber 45 has the double purpose of housing the regulating pot and plunger, and of keeping the glass uniform at the correct temperature. Inside the chamber 45 and beneath the pot 46 a gas flame is introduced by a burner 47.

Located adjacent to the chamber are vertical guides 55, in which slides a frame 54 which carries a plunger 58 controlling the issue of glass from the outlet. The frame is given a vertically reciprocating motion by mechanism specifically claimed and described in the aforesaid divisional application, Serial No. 759,172, and has on its upper end an outwardly projecting horizontal bracket 54$^a$, channeled on its upper face, the inner end of the bracket being formed into a saddle 54$^b$, while a well 54$^c$ is formed in the outer end of such bracket. A plunger supporting arm 56 has its depending outer end 56$^a$ located in the well 54$^c$ of the bracket of the frame, the body of the arm being in the channel of the extension and projecting therefrom inwardly to above the orifice 59 in the pot, where it is formed into a ring to receive the conical upwardly flaring head of the plunger 58, which is normally held on its seat in the ring by means of the leaf spring 62.

The arm 56 may be adjusted and locked lengthwise of the channel by the screws 54$^d$ in the bracket and laterally by the screws 54$^e$ and 54$^f$, which engage inclined faces 56$^g$ on the rear end of the arm and hold the same depressed. The weight of the plunger is carried by the saddle 54$^b$. A vertical screw 54$^g$ in the bottom of the well serves to lift the rear end of the arm and in connection with the lateral screws to determine the elevation of the ring above the aperture.

It will thus be seen that there have been provided means by which the lower end of the plunger may be adjusted horizontally in all directions, as well as vertically, all in respect to the sliding frame by which it is carried. The importance of this is that the plunger may be baked clay which is subject to considerable warping. By this invention, the lower end of the plunger when the latter is in its lower position, may be accurately positioned axially of the aperture, and without contact with the latter, which is of importance as a lateral displacement of such lower end of the plunger at such time may result in destroying the symmetry of the issued glass.

What I claim as the invention of THEODORE C. STEIMER is:

1. In an apparatus for delivering glass, the combination with a heated chamber containing molten glass and having an orifice for the flow of glass therefrom, of a frame having a ring axially above the orifice, means for reciprocating such frame, a part controlling the flow of the glass through the orifice having a head upon its upper end supported in such ring, and resilient means for depressing the part in respect to the frame.

2. In an apparatus for delivering glass, the combination with a container for the glass having an outlet, a vertical guide adjacent to the container, a frame sliding on the said guide, means for reciprocating the frame, an arm projecting from the frame to a position over the outlet, means for adjusting said arm tiltably and slidably on the frame to move the projecting end of the arm relatively to the outlet, and a plunger carried by the projecting end of the frame and cooperating with the outlet.

3. In an apparatus for delivering glass, the combination with a container for the glass having an outlet, a vertical guide adjacent to and outside of the container, a slide working on said guide, means for vertically reciprocating the slide, and a plunger cooperating with the outlet to control the discharge of glass therethrough, said plunger being movable by the slide and held rigidly against lateral movement with respect to the slide and yieldingly against right line movement in one direction in respect to said slide.

4. In glass feeding apparatus, a glass container having a submerged discharge outlet, an implement, and means detachably connected with said implement to hold the implement for movement in adhesive contact with the glass relatively to the outlet, said implement holding means including a resilient member tending to prevent relative movement of the implement and its holder.

5. In glass feeding apparatus, a glass container having a submerged outlet, a discharge control implement extending into the glass toward the outlet and adapted when operated to move relatively to the outlet, an arm having means embracing a portion of the implement and cooperating with the implement to prevent axial movement of the implement in one direction relatively to said arm, a resilient means carried by said arm for yieldingly preventing axial movement of the implement relatively to the arm in the opposite direction, and means for supporting said arm for movement to operate said implement.

6. In glass feeding apparatus, a glass container having a submerged outlet in its base, a vertically reciprocable operating means adjacent to the container, an arm fulcrumed intermediate its length on said operating means for limited swinging movement about a horizontal axis and so that an end portion of said arm extends above said outlet, an implement carried by said end portion of the arm in position to depend into the glass in the container toward said outlet, and means connecting the other end of said arm with said vertically reciprocable operating means, said connecting means being adjustable to swing said arm vertically on its fulcrum and to thereby change the position of the lower end of the implement relatively to the outlet.

7. In glass feeding apparatus, a glass container having a submerged outlet, a vertically reciprocable operating member adjacent to said container extending above an edge of the container, an arm supported on the operating means for tilting and longitudinally and laterally sliding movements, said arm extending across said edge of the container and having an end portion located above said outlet, an implement depending from said end of the arm into the glass toward the outlet, and means connecting the opposite end of said arm with said operating means to cause movement of the arm and the plunger with the operating means and so that said arm can be tilted or slid on said operating means to change the effect of the operating stroke of the implement on the glass at the outlet.

8. In glass feeding apparatus, a glass container having a submerged outlet, a vertically reciprocable operating mechanism adjacent to the container, a carrier movably supported on the operating mechanism and extending to a position over the outlet, an implement depending from the carrier into the glass in the container for movement with the carrier toward and from the outlet, and adjusting and securing means operable to positively adjust said carrier on the operating mechanism to vary the position and effect of the working stroke of the implement on the glass at the outlet and to firmly hold the carrier in adjusted position on the operating mechanism.

9. In glass feeding apparatus, a glass container having a submerged outlet, an implement adapted to move in adhesive contact with glass in the container, and means for supporting the implement for movement in the glass toward and from the outlet, said supporting means including opposed adjusting devices operable to positively adjust the implement relatively to the outlet.

10. In glass feeding apparatus, a glass container having a submerged outlet, a vertically reciprocable operating means adjacent to the container, an implement adapted to move in adhesive contact with the glass in the container, a carrier supporting said implement on said operating means for movement toward and from the outlet, and opposed adjusting means constituting a holding connection between the carrier and the operating means and operable to positively adjust the carrier and implement horizontally on said supporting means and relatively to the outlet.

11. In glass feeding apparatus, a glass container having a submerged outlet, a vertically reciprocable operating means adjacent to the container, an implement adapted to move in adhesive contact with the glass in the container, a carrier supporting said implement on said operating means for movement toward and from the outlet, and opposed adjusting means constituting a holding connection between the carrier and the operating means and operable to positively adjust the carrier relatively to the operating means to change the position of the lower end of the implement relatively to the outlet.

12. In glass feeding apparatus, a glass container having a submerged outlet, a vertically reciprocable operating mechanism adjacent to the container having a horizontally disposed head portion, a carrier movably supported on said head portion and extending to a position over said outlet, opposed adjusting means engaging opposite sides of said carrier for adjusting the carrier laterally on said head portion, other adjusting means engaging an end portion of said carrier for adjusting it longitudinally on said head portion, and still other adjusting means for adjusting said carrier vertically on said head portion, said adjusting means acting to lock said carrier to said head portion in any adjustment of the carrier, and an implement carried by said carrier in position to depend into the glass in the container for movement with the carrier and its operating mechanism toward and from the outlet.

13. In glass feeding apparatus, a glass container having a submerged outlet, an implement adapted to move in adhesive contact with the glass in the container, means for supporting the implement for movement in the glass toward and from the outlet, and screw threaded adjusting devices operable to positively adjust the implement relatively to the outlet.

14. In glass feeding apparatus, a glass container having a submerged outlet, an implement depending into the glass in the container substantially in axial alignment with the outlet, means for supporting the implement for movement in the glass toward and from the outlet without causing the implement to contact with the walls of the outlet, and screw threaded means for positively adjusting said supporting means to vary the position of the implement relatively to the outlet.

15. In glass feeding apparatus, a glass container having a submerged outlet, an implement depending into the glass in the container, means for supporting the implement and for moving it in the glass toward and from the outlet, without causing the implement to contact with the walls of the outlet, and means for adjusting said implement horizontally in directions extending substantially at right angles with each other.

CHARLES M. STEIMER,
*Executor of Theodore O. Steimer, Deceased.*